(12) United States Patent  
Donaldson et al.

(10) Patent No.: US 8,781,280 B2
(45) Date of Patent: Jul. 15, 2014

(54) CABLE EXPANSION JOINT

(75) Inventors: Christopher Donaldson, Greenville, SC (US); Lawrence Srutkowski, Florence, SC (US)

(73) Assignee: AFL Telecommunications LLC, Spartanburg, SC (US)

(*) Notice: Subject to any disclaimer, the term of this patent is extended or adjusted under 35 U.S.C. 154(b) by 285 days.

(21) Appl. No.: 13/143,150

(22) PCT Filed: May 10, 2011

(86) PCT No.: PCT/US2011/035829
§ 371 (c)(1),
(2), (4) Date: Jul. 1, 2011

(87) PCT Pub. No.: WO2011/146280
PCT Pub. Date: Nov. 24, 2011

(65) Prior Publication Data
US 2012/0039575 A1    Feb. 16, 2012

Related U.S. Application Data

(60) Provisional application No. 61/346,663, filed on May 20, 2010.

(51) Int. Cl.
*G02B 6/44* (2006.01)

(52) U.S. Cl.
USPC ............................................. 385/108

(58) Field of Classification Search
USPC ............................................. 385/108
See application file for complete search history.

(56) References Cited

U.S. PATENT DOCUMENTS 4,084,842 A * 4/1978 Stonitsch et al. ............ 285/47
5,941,482 A * 8/1999 Santagata .................... 246/428
2009/0304339 A1* 12/2009 Ohtsuka et al. .............. 385/114

* cited by examiner

*Primary Examiner* — Jerry Rahll
(74) *Attorney, Agent, or Firm* — Sughrue Mion, PLLC

(57) ABSTRACT

A cable is provided having an expansion joint. The cable includes a cable jacket which makes up an outer layer of the cable, a non-end section where the cable jacket is removed from the cable which forms an opening, and an expansion joint which covers the opening and is bonded to the cable jacket at opposite sides of the opening. The expansion joint is made up of a flexible or compressible material.

17 Claims, 2 Drawing Sheets

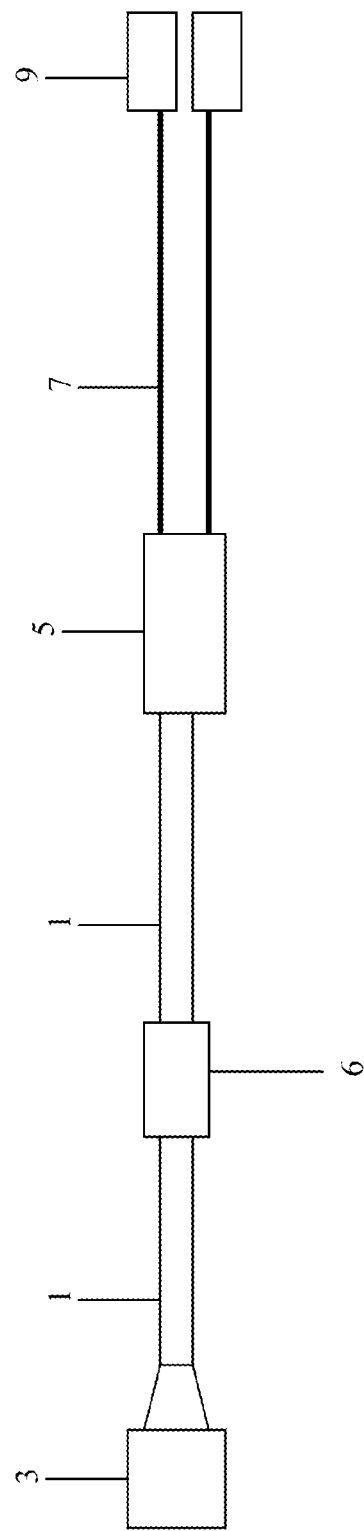

CABLE EXPANSION JOINT

CROSS-REFERENCE TO RELATED APPLICATIONS

This application claims priority from U.S. Provisional Application No. 61/346,663, filed on May 20, 2010, the disclosure of which is incorporated herein by reference in its entirety.

BACKGROUND

1. Field

The present invention generally relates to a cable expansion joint, and more particularly, to an optical cable expansion joint provided for use on loose tube jacketed fiber optic cable assemblies when an optical fiber(s) is bound or fixed at both ends.

2. Description of the Related Art

Loose tube fiber optic cables refer to an optical cable with loose tube structure. The fiber optic cable may consist of many layers. Except for the optical fiber, all other layers are used to protect the optical fiber and make the fiber optic transmission smooth and safe. The tube is inside the cable jacket and outside the optical fiber; the fibers are put inside the tube. The optical cable is referred to as "loose tube" because the outer diameter of the optical fiber is much less than the inner diameter of the tube. Thus, the optical fiber is shielded from being affected by the surrounding cable elements.

FIG. 1 illustrates a loose tube fiber optic cable system in which a twelve fiber (12F) microcore loose tube optical cable 101 is interposed between a USConec FOC Grade Multifiber Termination Push-on (MTP) connector 103 and a transition unit 105. The transition unit 105 is used to transition each of the twelve microfibers provided in the 12F microcore loose tube optical cable 101 into individual fiber outputs 107 (only two are shown) that are connected to one of twelve Standard Connector/Angled Physical Contact (SC/APC) connectors 109 (only two are shown).

There are two well-known problems associated with loose tube fiber optic cables. When subjected to elevated temperatures, the cable jackets of these loose tube fiber optic cables shrink. Additionally, the cable jackets of these loose tube fiber optic cables shrink and expand at a greater rate than aramid strength members and optic fibers protected by these cable jackets. When an optical fiber is constrained (i.e., bound at both ends by a connector or potted transition), the constrained optical fiber undergoes microbending that increases the insertion loss of the assembly.

As a counter-measure to this cable jacket shrinkage problem, manufacturers of fiber optic assemblies resort to two methods. First, manufacturers may anneal or pre-shrink the cable jacket to stabilize the cable jacket. However, this measure is impractical for use on long cable lengths. Second, manufacturers may leave a gap between the cable jacket end and a transition unit. This method is acceptable in many applications, but poses an area of mechanical weakness that reduces the reliability of the optical assembly when it is subjected to routine handling.

SUMMARY

Exemplary embodiments of the general inventive concept invention may overcome the above disadvantages as well as other disadvantages not described above.

According to an exemplary embodiment, there is provided a cable assembly including a first cable end unit, a second cable end unit, a cable having a first end coupled to the first cable end unit and a second end coupled to the second cable end unit, an expansion joint disposed on the cable between the first and the second cable end units.

The expansion joint may be made up of flexible or compressible material which covers an opening in the cable. Additionally, the expansion joint may be a braided sleeving.

The cable may include a cable jacket which makes up an outer layer of the cable, and a section where the cable jacket is removed from the cable which forms an opening. Accordingly, the expansion joint covers the opening and is bonded to the cable jacket at opposite sides of the opening.

The cable may be a fiber optic cable which includes a plurality of optical fibers, and the expansion joint allows the plurality of optical fibers within the fiber optic cable to helically compress when the cable jacket shrinks.

According to another exemplary embodiment, there is provided a cable including a cable jacket which makes up an outer layer of the cable, a non-end section where the cable jacket is removed from the cable which forms an opening, and an expansion joint which covers the opening and is bonded to the cable jacket at opposite sides of the opening.

The expansion joint may be made up of flexible or compressible material which covers an opening in the cable. Additionally, the expansion joint may be a braided sleeving.

The cable may be a fiber optic cable which includes a plurality of optical fibers, and the expansion joint allows the plurality of optical fibers within the fiber optic cable to helically compress when the cable jacket shrinks.

According to another exemplary embodiment, there is provided a method of manufacturing a cable which includes a cable jacket and an expansion joint. The method of manufacturing includes removing the cable jacket from a non-end section of the cable, forming an opening, covering the opening with the expansion joint, and bonding the expansion joint to the cable jacket at opposite sides of the opening.

The expansion joint may be made up of flexible or compressible material which covers an opening in the cable. Additionally, the expansion joint may be a braided sleeving.

The cable may be a fiber optic cable which includes a plurality of optical fibers, and the expansion joint allows the plurality of optical fibers within the fiber optic cable to helically compress when the cable jacket shrinks.

The expansion joint may be bonded to the cable jacket by heat shrinking the expansion joint to the cable jacket at the opposite sides of the opening.

BRIEF DESCRIPTION OF THE DRAWINGS

The above and other aspects of the present invention will become more apparent from the following description of exemplary embodiments, taken in conjunction with the accompanying drawings of which:

FIG. 2 illustrates a fiber optic cable system according to an exemplary embodiment.

Throughout the drawings, the same drawing reference numerals will be understood to refer to the same elements, features, and structures.

DETAILED DESCRIPTION OF THE EXEMPLARY EMBODIMENTS

Figure 1:
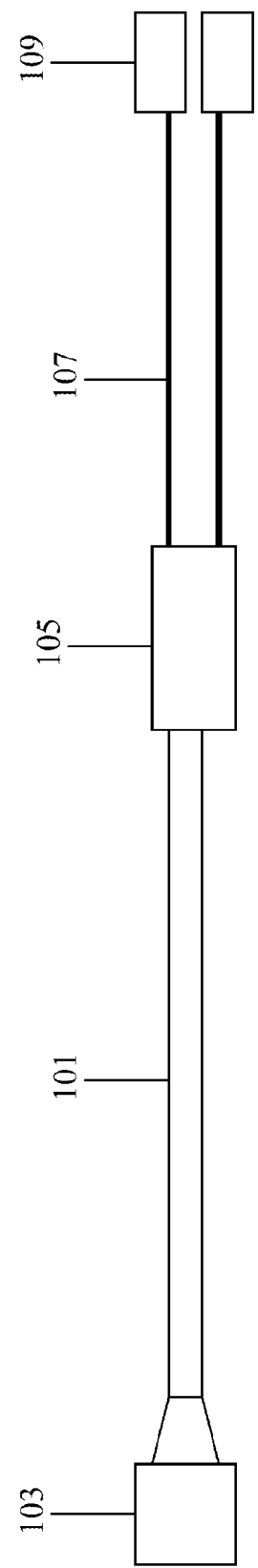
FIG. 1 illustrates a fiber optic cable system according to a related art system.

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the general inventive concept. Also, descriptions of well-known functions and constructions are omitted for clarity and conciseness. In the following description, like drawing reference numerals are used for the like elements, even in different drawings.

According to the exemplary embodiments, an optical cable expansion joint is provided for use on loose tube jacketed fiber optic cable assemblies when an optic fiber(s) is bound or fixed at both ends. In particular, an "expansion joint" midpoint is disposed between the bound or fixed ends of the fiber optic cable that allows the optical fibers to helically compress when a jacket shrinks, for example, due to aging or due to exposure to low temperatures.

FIG. 2 illustrates a fiber optic cable system according to an exemplary embodiment. In particular, the fiber optic cable system includes a loose tube fiber optic cable system in which a twelve fiber (12F) microcore loose tube optical cable 1 is interposed between a USConec FOC Grade Multifiber Termination Push-on (MTP) connector 3 and a transition unit 5. The outer layer of the fiber optic cable 1 is a cable jacket which may shrink or expand based on environmental temperatures. There is no gap between a cable jacket end of the optical cable 1 and the transition unit 5. Similarly, there is no gap between another cable jacket end of the optical cable 1 and the connector 3. An expansion joint 6 is disposed at a location between the bound or fixed ends of the fiber optic cable 1. The transition unit 5 is used to transition each of the twelve microfibers provided in the 12F microcore loose tube optical cable 1 into individual fiber outputs 7 that are connected to one of twelve Standard Connector/Angled Physical Contact (SC/APC) connectors 9. In this case, only two of the twelve fibers are shown for simplicity.

Although the fiber optic cable system of FIG. 2 is shown utilizing an MTP connector 3 and a transition unit 5 coupled to each end of the fiber optic cable 1, any other cable termination type or cable transition structure type component may be used at either end of the fiber optic cable 1.

The expansion joint 6 is added between the MTP connector 3 and the transition unit 5 by removing a section (e.g., 100 mm) of cable jacket from the fiber optic cable 1, which creates a window or opening in the fiber optic cable 1. The window extends around the entire periphery of the fiber optic cable 1. However, only the cable jacket of the fiber optic cable 1 is removed, and therefore the underlying aramid and optic fibers are left untouched. The expansion joint 6 is a flexible or compressible cover (e.g., braided sleeving) that is placed over the window to cover the entire opening. This flexible or compressible cover is fixed to the cable jacket on opposite sides of the window. Heat shrink, for example, is an effective method to join the flexible or compressible cover to the cable jacket ends on opposite sides of the window. Accordingly, the expansion joint 6 is made up of a flexible or compressible cover which is fixed to the cable jacket on opposite sides of the window.

To improve the tensile strength of the flexible or compressive cover of the expansion joint 6, some the aramid (i.e., aramid yarn) may be incorporated into the heat shrink. This design allows manufacturers to compensate for jacket shrink in cable assembly design in an inexpensive, operationally flexible manner.

Accordingly, by adding the expansion joint 6, the fiber optic assembly may operate over an extended temperature range without degrading optical performance despite material limits of the fiber optic loose tube cable. In particular, the expansion joint 6 allows the optical fibers within the fiber optic cable 1 to helically compress when a jacket shrinks, for example, due to aging or due to exposure to low temperatures. In addition, the fiber optic cable 1 retains its tensile strength. The fiber optic cable 1 also retains the minimum bend radius. Meanwhile, the fiber optic cable components (e.g., the optical fiber/s) remain protected.

What is claimed is:

1. A cable assembly comprising:
   a first cable end unit;
   a second cable end unit;
   a cable having a first end coupled to the first cable end unit and a second end coupled to the second cable end unit; and
   an expansion joint disposed on the cable between the first and the second cable end units, wherein the expansion joint is configured to helically compress the cable.

2. The cable assembly of claim 1, wherein the expansion joint is made up of flexible material which covers an opening in the cable.

3. The cable assembly of claim 2, wherein the expansion joint is a braided sleeving.

4. The cable assembly of claim 1, wherein the cable comprises:
   a cable jacket which makes up an outer layer of the cable; and
   a section where the cable jacket is removed from the cable which forms an opening,
   wherein the expansion joint covers the opening and is bonded to the cable jacket at opposite sides of the opening.

5. The cable assembly of claim 4, wherein the expansion joint is made up of compressible material.

6. The cable assembly of claim 4, wherein the expansion joint is a braided sleeving.

7. The cable assembly of claim 1, wherein the cable is a fiber optic cable.

8. The cable assembly of claim 7, wherein the fiber optic cable comprises a plurality of optical fibers.

9. A cable comprising:
   a cable jacket which makes up an outer layer of the cable;
   a non-end section where the cable jacket is removed from the cable which forms an opening; and
   an expansion joint which covers the opening and is bonded to the cable jacket at opposite sides of the opening, wherein the expansion joint is configured to helically compress the cable.

10. The cable of claim 9, wherein the expansion joint is made up of compressible material.

11. The cable assembly of claim 9, wherein the expansion joint is a braided sleeving.

12. The cable of claim 9, wherein the cable is a fiber optic cable which comprises a plurality of optical fibers.

13. A method of manufacturing a cable comprising a cable jacket and an expansion joint, the method comprising:
   removing the cable jacket from a non-end section of the cable, forming an opening;
   covering the opening with the expansion joint; and
   bonding the expansion joint to the cable jacket at opposite sides of the opening, wherein the cable is a fiber optic cable which comprises a plurality of optical fibers, and the expansion joint is configured to helically compress the plurality of optical fibers within the fiber optic cable when the cable jacket shrinks.

14. The method of manufacturing the cable of claim 13, wherein the expansion joint is made up of compressible material.

15. The method of manufacturing the cable of claim 13, wherein the expansion joint is a braided sleeving.

16. The method of manufacturing the cable of claim 15, wherein the cable is a fiber optic cable which comprises a plurality of optical fibers.

17. The method of manufacturing the cable of claim 13, wherein the expansion joint is bonded to the cable jacket by heat shrinking the expansion joint to the cable jacket at the opposite sides of the opening.

* * * * *